April 26, 1949.  J. H. VICTOR  2,468,247

OIL SEAL

Filed April 5, 1945

INVENTOR.
John H. Victor
BY
Parkinson & Lane
Attys.

Patented Apr. 26, 1949

2,468,247

UNITED STATES PATENT OFFICE 2,468,247

OIL SEAL

John H. Victor, Wilmette, Ill., assignor to Victor Manufacturing & Gasket Company, Chicago, Ill., a corporation of Illinois Application April 5, 1945, Serial No. 586,696

4 Claims. (Cl. 288—3)

The present invention relates to an oil or fluid seal and especially to a novel pre-formed sealing element and to a novel method and manner of mounting this sealing element in a retaining shell or housing whereby to insure its retention in a fixed position in the housing. Furthermore, the novel assembly affords maximum sealing and resistance against leakage under all conditions to which the seal may be subjected in use.

In the novel embodiment of an oil seal, the sealing element is molded about a pre-formed washer in such manner as to provide a tapered compression ridge of the elastomer material of which the sealing element is formed and which when the sealing element is mounted in its retaining shell or housing insures a positive sealing against the inner radial face of the bottom or outer channel of the housing.

The invention further comprehends a novel reinforcing washer of the pinch-off type in which the opposite edges are flanged to provide an annular depression or channel for reception of the plastic material and which permits the inner diameter of the sealing element to be displaced or increased in diameter by an amount that insures mechanical retention of the sealing element in the housing and prevents leakage of the fluid being sealed between the radial flange of the sealing element and the bottom or outer channel section of the housing.

Another novel feature of the present method and manner of mounting the sealing element in its retaining shell or housing, is that any distortion of the sealing lip is effectively prevented. This assures optimum sealing between the oil seal and the shaft to be sealed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figure 1:
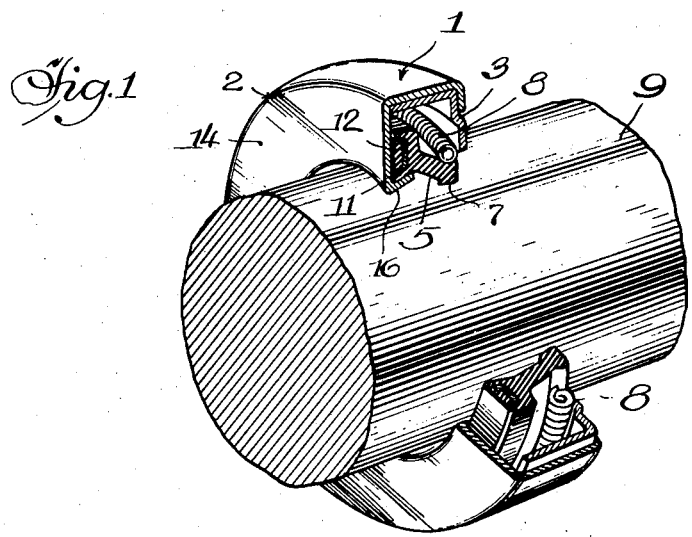
Figure 1 is a view in perspective of the novel oil seal surrounding a shaft and with the retaining shell or housing and sealing element broken away to more clearly disclose the construction and assembly of the invention.
Figure 2:
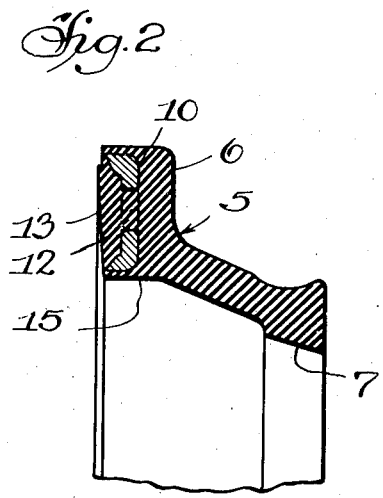
Figure 2 is a fragmentary enlarged view in vertical cross section through the reinforced sealing element prior to its assembly in the retaining shell or housing.

This invention is a continuation-in-part of my co-pending application Serial No. 509,363, filed November 8, 1943, now Patent #2,405,279, issued August 6, 1946.

Referring more in detail to the disclosure in the drawing, the present novel oil seal comprises a retaining shell or housing 1 consisting of an outer or bottom channel section 2 and an inner or top channel section 3 which when combined or assembled provide a substantially channel shaped retaining shell or housing. The cylindrical wall 4 of the bottom or outer channel section provides a press fit in a surrounding housing (not shown) in which the seal assembly is mounted.

The invention comprehends a novel sealing element 5 composed of an oil or fluid resistant resilient material or elastomer such as compounded synthetic rubber or the like provided with a substantially radially disposed flanged portion 6 and sealing lip 7, the rear surface of the sealing lip being so formed or contoured as to receive and retain a contractile spring 8 for maintaining the sealing lip in continuous sealing contact with a shaft 9. Embedded within the radial flanged portion 6 of the sealing element is a pre-formed washer 10 of the pinch-off type provided with outwardly projecting annular flanges 11 and suitably spaced perforations 12. This washer is preferably embedded and molded into the sealing element in such manner that the elastomer or resilient material flows through these openings and is anchored therein in the molding operation. In addition, prior to molding, the washer is coated with a bonding agent such as cement, so that during the molding operation the sealing element is made to adhere firmly to the washer.

In the molding of the sealing element, the invention comprehends forming a tapered compression ridge 13 of the elastomer material incorporated in the clamped section to thereby insure a positive and most effective seal against the radially extending interior face of the side wall 14 of the bottom channel section when the sealing element is clamped in position. Also the inner wall of this sealing element at 15 is formed as a section of a cylinder to permit most effective clinching by the inturned lip 16 of the bottom channel. This prevents any distortion of the sealing lip 7 and maintains its controlled profile so as to assure uniform sealing contact of the lip upon the shaft.

Figure 3:
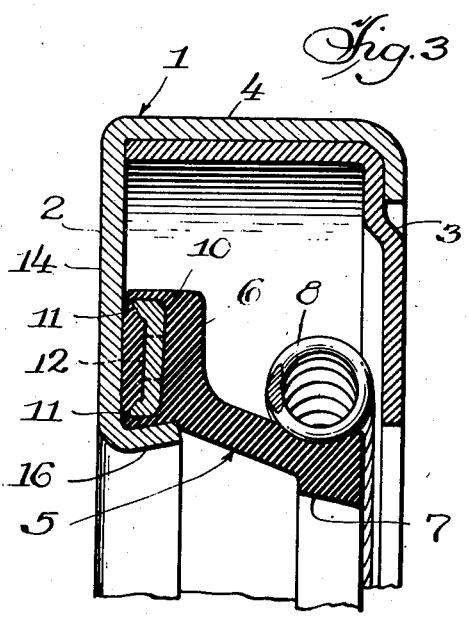
Figure 3 is a fragmentary enlarged view in vertical cross section through the oil seal assembly and showing the manner of mounting the reinforced sealing element within the retaining shell or housing.

It will thus be seen that when this lip 16 is turned or crimped inwardly to clamp the sealing element in anchored position, the sealing at the clamp area extends initially from the point whereinthis crimped-over edge 16 compresses into the resilient material of the sealing element, along the layer of resilient material around the preformed washer 9 and along most of the face of the sealing material in compression against the bottom channel. This crimping also causes displacement of the pre-formed washer and forces the tapered compression ridge 13 tightly against the interior radial face of the flange 14 to thereby insure a most effective sealing of the sealing element against the bottom channel when assembled as shown in Figures 1 and 3.

The sealing element with its embedded washer may be pre-formed in large quantities and of standardized construction for quick assembly in retaining shells or housings of different dimensions or diameters. It further eliminates bonding of the sealing element to its retaining shell or housing and when the edge 16 of the washer is crimped over the inner diameter of the sealing element, this element and its washer 9 are expanded to such an extent as to become securely anchored in the shell and prevented from rotating relative thereto.

Having thus described my invention, I claim:

1. In a fluid seal, a retaining shell comprising an inner and an outer cylindrical wall joined at one edge by a flat annular wall; a sealing element comprising a flanged washer containing a plurality of perforations and a resilient sealing element having an annular portion encompassing and bonded to said washer, the face of said annular portion of said sealing element adjacent the flanges on said washer being tapered from a thick part adjacent the outer flange to a thin part adjacent the inner flange, said tapered face resting against the flat wall of said shell only at the thick point during assembly and being drawn into seal-forming engagement with said wall as the inner cylindrical wall of the shell is expanded into frusto-conical shape to lock the sealing element against rotation in the shell.

2. In a fluid seal, a retaining shell comprising an inner and an outer cylindrical wall joined together at one edge by a flat annular wall, a sealing element comprising a flanged washer containing a plurality of perforations and a resilient sealing element having an annular portion encompassing said washer and extending through said perforations and bonded to the washer; the face of said annular portion adjacent the flanges on said washer being tapered from a thick part adjacent the outer flange to a thin part adjacent the inner flange, said thick part only engaging the flat wall of said shell during assembly, and said washer being dished to draw the thin part into seal-forming engagement with said flat wall by expansion of the inner cylindrical wall of said shell to lock the sealing element against rotation in the shell.

3. In a fluid seal, a retaining shell comprising, an outer cylindrical wall and a flat annular wall projecting inwardly from one edge of said outer wall, an annular washer disposed in juxtaposition to said annular wall, flanges on said washer extending towards said flat wall, a resilient sealing element having a base encompassing said washer, the portion of said base between the washer and annular wall tapering from a thick portion adjacent the outer edge of the base to a thin portion adjacent the inner edge thereof, and a flange on the inner edge of said annular wall extending alongside of said base and flaring outwardly towards said outer wall to dish said washer and force the thinner part of said tapered base portion into seal-forming engagement with said annular wall.

4. In a fluid seal, a retaining shell comprising an outer cylindrical wall and a flat annular wall projecting inwardly from one edge of said outer wall, an annular washer disposed in juxtaposition to said flat wall, flanges on the edges of said washer, a resilient sealing element having a base encompassing said washer, the portion of the base between the washer and the flat wall tapering from a thick part inside the outer flange to a thinner part inside the inner flange, and a flange on the inner edge of said annular wall disposed alongside of said base and flaring outwardly from said annular wall toward said cylindrical wall to expand and dish said washer thereby to lock the sealing element and washer against rotation with respect to the shell and to force said tapered portion into seal-forming engagement with said shell.

JOHN H. VICTOR.

REFERENCES CITED

The following references are of record in the file of this patent:

UNITED STATES PATENTS

| Number | Name | Date |
| --- | --- | --- |
| 1,273,738 | Christenson | July 23, 1918 |
| 2,289,659 | Kosatka | July 14, 1942 |
| 2,319,067 | Kosatka | May 11, 1943 |
| 2,402,114 | Le Clair | June 11, 1946 |
| 2,405,279 | Victor | Aug. 6, 1946 |